United States Patent

[11] 3,573,385

[72] Inventors Charles J. Provenzano
Staten Island, N.Y.;
Richard A. Thompson, Hartford, Conn.

[21] Appl. No. 818,563
[22] Filed Apr. 23, 1969
[45] Patented Apr. 6, 1971

[73] Assignee Bell Telephone Laboratories, Incorporated
Murray Hill, N.J.

[54] OUTDIALING INFORMATION STORE FOR SWITCHING SYSTEMS
16 Claims, 10 Drawing Figs.

[52] U.S. Cl. .......... 179/18
[51] Int. Cl. .......... H04m 15/06
[50] Field of Search .......... 179/2 (CA), 2 (DP), 8, 9, 18.61, 18.9 (Cursury), 27.021, 27.12; 340/172.5

[56] References Cited

UNITED STATES PATENTS

| | | | |
|---|---|---|---|
| 3,062,918 | 11/1962 | Williford | 179/18(.61) |
| 3,243,514 | 3/1966 | Moore et al. | 179/17.1 |
| 3,404,377 | 10/1968 | Frankel | 340/172.5 |

*Primary Examiner*—Kathleen H. Claffy
*Assistant Examiner*—David L. Stewart
*Attorneys*—R. J. Guenther and James Warren Falk

ABSTRACT: A telephone switching system is described in which a central office and a plurality of private branch exchanges are interconnected by trunks. A serially arranged recirculating memory associated with the central office receives a calling station and trunk identity message over a data link, and the station identity code is stored in one of a group of discrete storage areas in the memory. The station identity code is preceded by the trunk code so that the calling station code, as addressed by the received trunk information, may be inserted or retrieved during one complete scan of the recirculating memory.

FIG. 9

INVENTORS C. J. PROVENZANO
R. A. THOMPSON
BY J S Cubert
ATTORNEY

OUTDIALING INFORMATION STORE FOR SWITCHING SYSTEMS

BACKGROUND OF THE INVENTION

Our invention is related to communication systems and more particularly to station identification arrangements in telephone systems.

In telephone systems, private branch exchanges (PBX) are extensively used for telephone communication within a customer's office. In such exchanges inward calls are dialed to the directory number and are completed to the desired station by an attendant. Outward calls are generally completed by dialing "9" plus the number. More recently an improved form of PBX system, called centrex, has been put into service. Centrex provides direct inward dialing and identified outward dialing. The dialing arrangements permit calls to be completed to extension numbers at the PBX without going through an attendant. Identified outward dialing additionally provides itemized statements of toll charges for each PBX extension number.

Identified outward dialing (IOD) can be implemented by operator identification or through automatic identification of the extension number. In automatic identification systems the extension number is determined without the intervention of an operator and is forwarded automatically to the message accounting equipment for association with the other details of the call.

Automatic identified outward dialing (AIOD) requires specialized equipment to enable each centrex PBX to identify the extension number on each outgoing call to the central office. The station identity information along with the identity of the PBX trunk used for the call is forwarded to the central office. At the central office, AIOD requires a station identification store to store the station numbers and associated trunk numbers so that they may be recorded by the automatic message accounting (AMA) equipment when toll billing is required. A special data link connects number identification equipment at the PBX with the station identification store in the central office and is used to transmit the station number and the associated trunk number information from the PBX to the central office. Priorly known equipment available for AIOD service is generally capable of serving a large number of PBX trunks distributed over a large plurality of private branch exchanges. There are many installations, however, that do not require this large capacity so that it is desirable to provide AIOD equipment with a smaller capacity and greater economy. In such AIOD equipment it is particularly wasteful to have the insertion and retrieval of information in the station identification store occupy a plurality of cycles of operation.

BRIEF SUMMARY OF THE INVENTION

Our invention is a circuit for the automatic identification of outward dial calls originating from stations associated with one of a plurality of private branch exchanges. The circuit includes a memory containing a plurality of discrete storage areas arranged in sequential fashion. The memory stores trunk and station data received from the PBXs in that order and makes the data as well as exchange data available to central office accounting equipment. Control apparatus connected with the storage areas operates to insert, check, and update station identity and exchange identity information in the memory. The control apparatus may be directed by a PBX to store information or directed by central office equipment to correlate the trunk number transmitted therefrom with the trunk number stored in a discrete storage area and transmit the associated station number to the central office.

In accordance with one aspect of the present invention, the memory and control apparatus are parts of a switching system message. A store in the control apparatus receives a message including first and second codes, arranged so that the first code precedes the second code. The memory contains a plurality of messages in a serial area of discrete storage areas. The first code received by the control apparatus store from one of several alternative sources is matched with the one of the first codes so that the second codes can be exchanged between the memory and the control apparatus store immediately subsequent to a first code match during the same memory scan. The control apparatus sequentially scans the memory storage areas using trunk data from the central office to address the desired station information. One portion of the control apparatus accesses the discrete storage area containing the addressing trunk code. In accordance with another aspect of the present invention, the arrangement of the memory is such that the trunk code precedes the exchange and station data so that only one sequential scan of the complete memory is required to appropriately insert or retrieve the station identity data in any selected storage area. The control apparatus and the memory form a content addressable memory wherein only one sequential scan of the storage areas is needed to retrieve station and exchange identification information.

Signals from one of the private branch exchanges representative of an outward dialing station and the calling trunk are transmitted over a data link to the control apparatus of the automatic station identification circuit and the control apparatus operates to verify the signals for proper format. The data corresponding to station identity as addressed by the calling trunk data is then entered into the discrete storage area which contains the calling trunk data previously entered. In accordance with an aspect of our invention, the matching of the stored trunk data with the trunk data transmitted from the PBX causes the exchange and station identity to be inserted in the storage area after the stored trunk data during one memory scan.

According to another aspect of the invention, signals from the central office representative of the calling trunk are transmitted to the control apparatus wherein the calling trunk data is used to address outward dialing station information stored in the discrete storage area having identical trunk data. The exchange and station information is then transferred to the central office accounting equipment via the control apparatus immediately after and during the same memory scan used for addressing.

According to another aspect of the invention, the absence of trunk data in the memory corresponding to the addressing trunk data in the control apparatus during one memory scan causes the control apparatus to address a blank storage area during the next succeeding memory scan and the transmitted station identification and trunk data are stored therein.

In an illustrative embodiment of the invention the memory is of the reentrant delay line type which stores and serially recirculates trunk PBX and station identification information in response to requests from the associated PBXs. The control apparatus comprises a shift register for temporary storage of trunk, PBX and station identification information transmitted through the associated data link and memory addressing logic responsive to the trunk data in the shift register for inserting PBX and station identification information in the memory upon an outward dialing request from an associated PBX. The memory addressing logic is also responsive to a request from the associated central office to retrieve PBX and station identification data contained in the storage area identified by a particular calling trunk number. The addressing logic operates to match the trunk address of the control apparatus with the trunk address obtained from the memory. The reentrant memory further includes a plurality of discretely accessed storage devices apart from the delay line which permits insertion and retrieval of station identification information immediately subsequent to a match between the addressing trunk data and the trunk data in one of the storage areas. In this way only a single scan of the recirculating memory storage areas is required to complete an information transfer to or from the reentrant delay line.

GENERAL DESCRIPTION

Figures 1, 9:
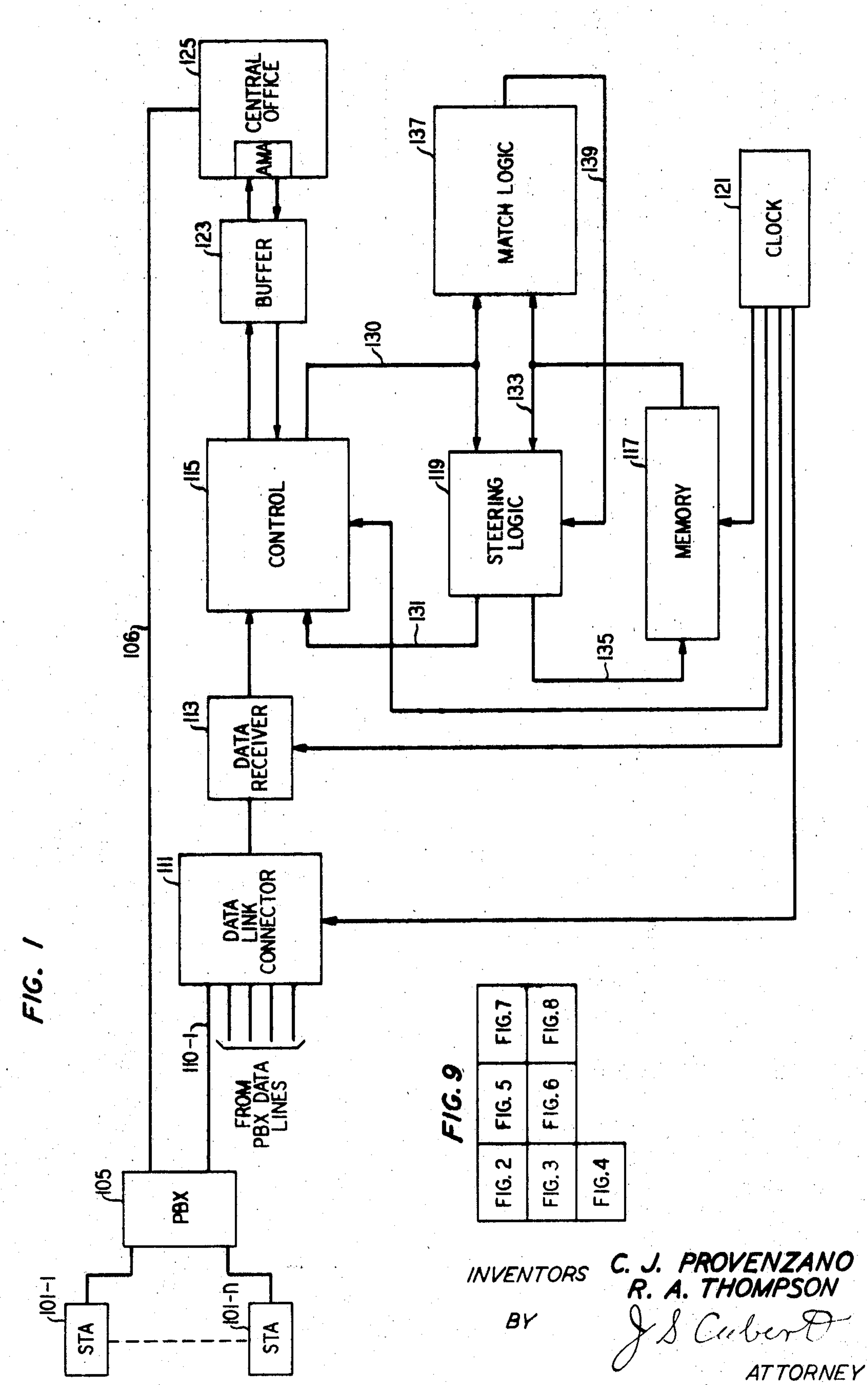
FIG. 1 depicts a general block diagram of an embodiment of our invention.
FIG. 9 shows the arrangement of FIGS. 2—8.

A general block diagram of the station identification store is shown in FIG. 1. The store circuit includes a path for selectively inserting information in control 115 related to outward dialing from a station such as station 101–1 associated with PBX 105. If station 101–1 is an outward dialing station, PBX 105 generates a message containing trunk and station identification information which is transmitted via line 110–1 to data link terminal 111 of the automatic station identification circuit. The information includes data corresponding to the number of calling trunk 106 over which communication is established between the PBX 105 and central office 125 and data corresponding to the outward dialing station identity. Signals from the PBX are received at connector 111 and transmitted therefrom to data receiver 113.

In data receiver 113, the information is converted into pulse form acceptable to control 115 and memory 117. These codes are then transmitted to control 115. The trunk code is transmitted first, followed by the station code. Control 115 receives the codes in serial fashion in a shift register which stores the transmitted message. When the shift register is filled, a data link number corresponding to the PBX information source is inserted between the trunk and station codes. The shift register contents may then be serially circulated around the path including control 115, lead 130, steering logic 119, and lead 131. The contents of reentrant-type memory 117 are continuously recirculated around the path including memory 117, lead 133, steering logic 119, and lead 135.

Steering logic 119 includes a switching arrangement which operates in one state to maintain the aforementioned paths and operates in a second state to interchange the shift register data with the reentrant memory data. In this second state, information from lead 133 is applied to lead 131 and shift register information from lead 130 is supplied to lead 135 so that there is an interchange of information between a particular memory storage area and the message stored in control 115.

While the information in the control path and in the reentrant memory path are separately being recirculated, match logic 137 compares the output of memory 117 appearing on lead 133 with the output of control 115 appearing on lead 130. The trunk code of control 115 is used to address memory 117. Since each storage area of memory 117 stores the trunk code first, this trunk code may be identical to that stored in control 115. When the match logic determines that the two trunk codes are identical, it causes a signal to be sent to logic 119 via lead 139 which operates to alter the state of the steering switch arrangement so that the station identity information following the trunk code of control 115 is inserted into the storage area of memory 117 just after a match of trunk codes. In this way, station identity is transmitted from PBX 105 to the station identification store and appropriately placed in the corresponding storage area of memory 117.

In the event that none of the storage areas of memory 117 contains the same trunk code as transmitted to control 115 from PBX 105, another cycle of the memory occurs in which match logic 117 detects a blank, e.g., unused storage area, in memory 117. When such an area is detected by match logic 137, the trunk data and station identity codes are transferred from control 115 to memory 117 via steering logic 119. It should be noted that the memory or some portion thereof may be initially blank. After an unsuccessful memory scan associated with a trunk code not contained in memory 117, the station identification information including the new trunk code is stored in a detected blank storage area during the immediately successive scan. In this way, new information may be stored in an initially blank memory or new trunk information may be stored.

When, during the course of an outdialing call, it is necessary to retrieve the station identification and data link codes for use in billing in the central office, the trunk number addressing information is transmitted from the AMA equipment in central office 125 to control 115 via buffer 123. The buffer converts the trunk number information into a two-out-of-five code for insertion into the shift register of control 115. A match between the output of the shift register and memory 117 is then performed in logic 137. A successful match transfers the station and data code addressed by the central office trunk code from memory 117 to control 115 via steering logic 119. The station and data codes are then sent to central office 125 via buffer 123 which operates to translate the two-out-of-five code used in the memory to the one-out-of-ten code required by the central office.

Because of erroneous operation of the PBX, the central office, or the station identification store equipment, it may be necessary to remove the station code and data number code associated with a specific trunk code from memory 117, or all the station codes associated with a specific data link code. This is done to avoid false billing to a station number. When it is required to remove information associated with a trunk code, the aforementioned matching process is conducted to address particular storage areas in memory 117. Upon detection of the appropriate trunk code in memory 117 at match logic 137, the associated station and data link codes are erased from memory.

In the event that it is necessary to remove all information concerning a particular PBX, a match is performed between the data link code in control 115 and the data link codes in the memory. When a match between data link codes is detected, the associated station numbers are erased from memory. The matching process used in memory erasures is substantially similar to that used in entering new information into memory 117 or withdrawing station identity information from memory 117.

Provision is also made in the AIOD for changes in trunk locations. Station information may be stored in memory 117 together with a particular trunk code. If after the information is entered the trunk associated with the station information has been changed, it is desired to address the station information in accordance with a new trunk code. This is done by placing a special word into control 115. The first portion of the word contains the new trunk code. This is followed by a special code in the data link portion of the word which signals the control that the word is concerned with a trunk change. The special data link code is then followed by the old trunk number. Upon a memory match based on the new trunk number, the special data link code and the old trunk number from memory 117 are placed in control 115 and are also reentered into the memory to maintain the trunk change word for future use. The data in control 115 is then shifted so that the old trunk number is placed in the addressing part of the control. A new memory scan is then started so that the station identity code associated with the old trunk number is transmitted to the central office via control 115 in response to a request based on the new trunk number.

Detailed Description

Memory Recirculation

FIGS. 2 through 8 show an illustrative embodiment of the invention including a recirculating memory for storing trunk and station identification information; a central register to address the memory, to transfer information between the PBX and memory, and between the memory and the central office accounting equipment; and associated logic to control the transfers. The recirculating memory is shown on FIG. 5. In this embodiment the memory 117 comprises a main delay 402 and a cascaded series of shift register stages and controlling gates. Delay 402 is a magnestrictive delay line for storing 10,119 bits. The output of delay 402 is applied to shift register stage 4MO via register stages 4MOL4, 4MOL3, 4MOL2 and 4MOL1, and the output of stage 4MO is transmitted via lead LMO, NOR gate 3MM and NOR gate 3MII to line 308 which in turn is connected to shift register stage 4MI.

Each of the shift register stages of the memory has a toggle input which receives clock pulses from clock 404 via cable 406 at a 1 megacycle rate and a TC and a TS input. The TC and TS inputs are used as conditioning inputs. If a low (zero) signal is applied to the TC input of a shift register stage such as 4MI and a high (one) signal is applied to the TS input of 4MI, the next negative-going edge of the clock signal transmitted to the toggle input will put the register stage into the set state so that the one output is high and the zero output is low. If a high signal is applied to the TC input and a low signal is applied to the TS input, the next negative transition of the clock signal will reset the register stage so that the zero output is high and the one output is low. In this way the information stored in a stage is transmitted to the succeeding shift register stage where it is stored until the next negative going toggle input occurs. Main delay 402 receives the output of stage 4MI and in response thereto, under control of clock pulses, it provides a delayed output signal to stage 4MOL4. The memory loop stores 10,125 bits of information stored in serial fashion.

Figure 10:
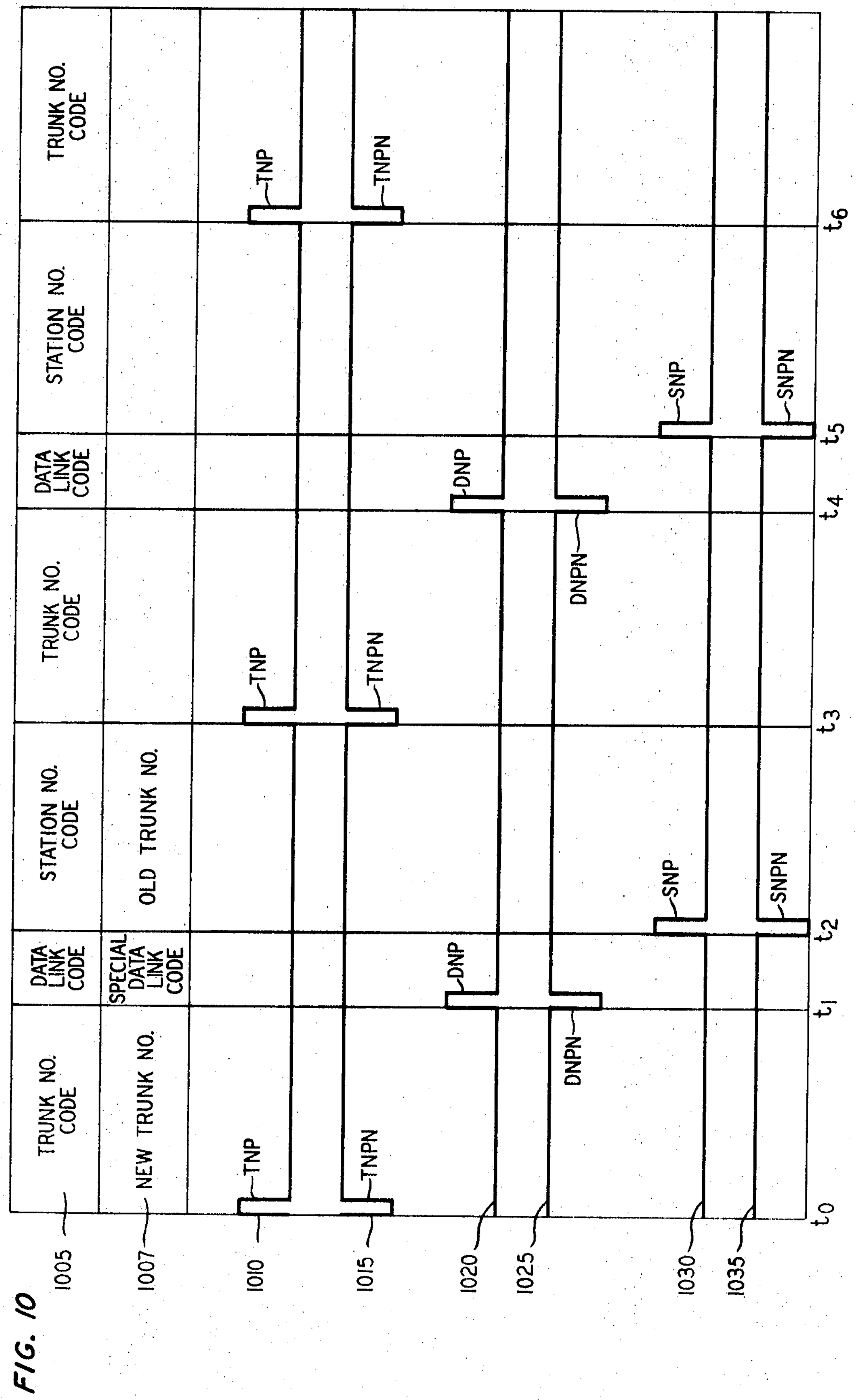
FIG. 10 shows waveforms useful in describing the embodiment of FIGS. 2—8.

The arrangement of information in the memory is illustrated on 1005 of FIG. 10. Each memory word comprises 45 bits and is arranged so that a 20-bit trunk number code is stored first, followed by a 5-bit data link code which is in turn followed by a 20-bit station number code. The 45-bit code occupies one discrete storage area and is followed by succeeding discrete storage areas as illustrated on 1005, FIG. 10.

Figure 3:
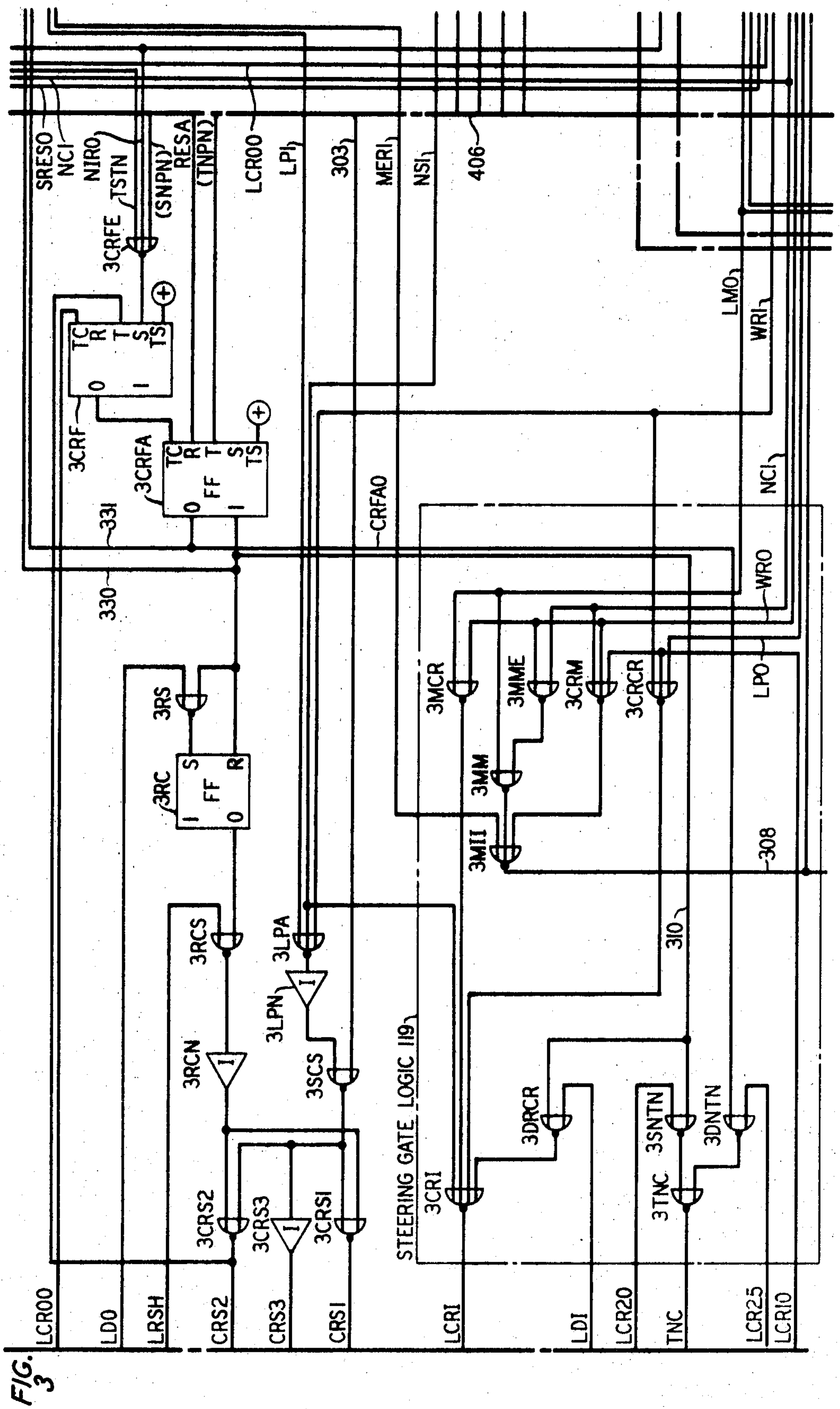
Figure 4:
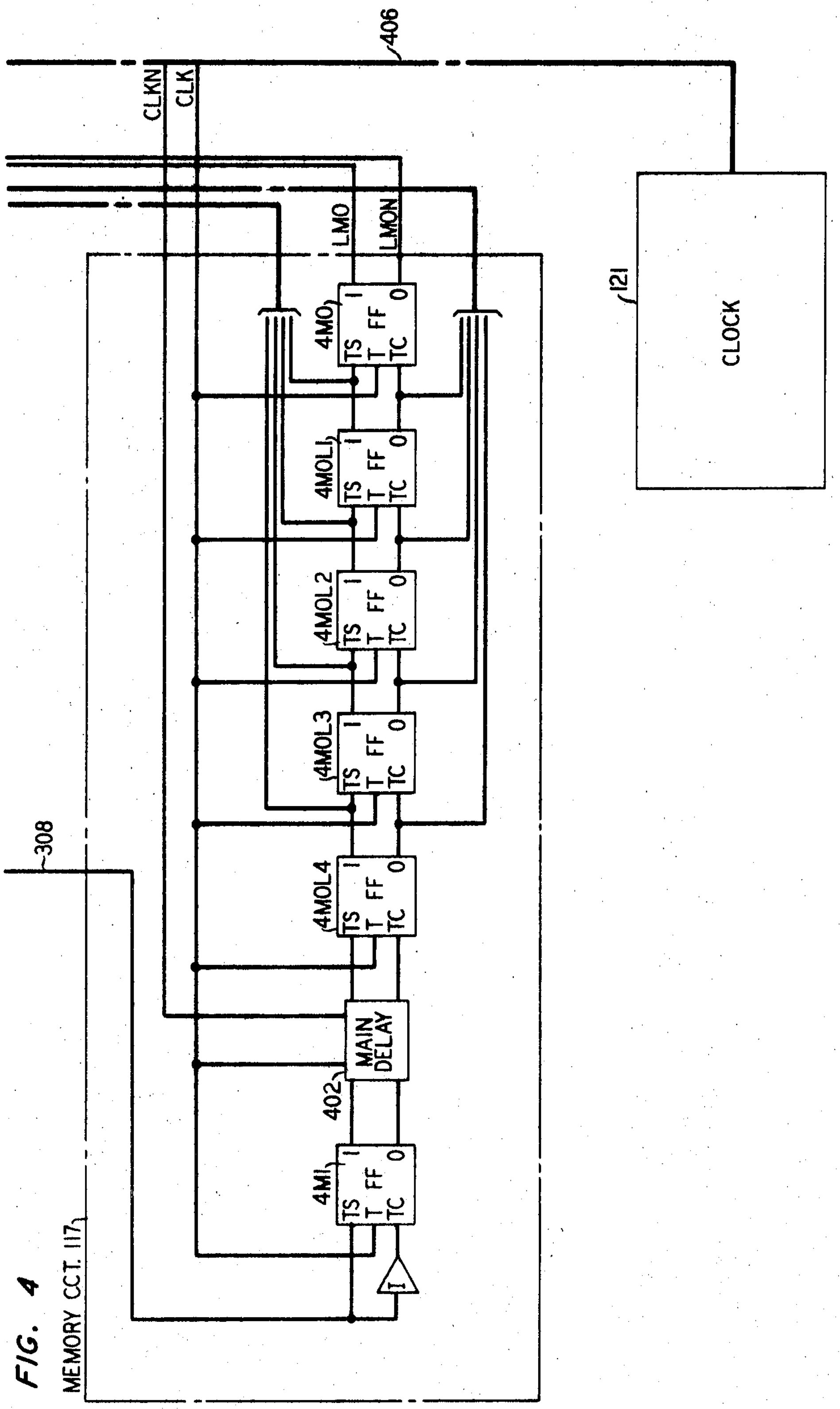

Clock 121 provides pulses at a 1 megacycle rate which control the timing of the memory loop of FIG. 4 as well as the shift register stages of central register 210 and the remainder of the logic. In addition to the 1-megacycle-rate clock pulses, a TNP and a TNPN pulse are generated. These pulses are shown on waveforms 1010 and 1015, respectively, at $t_0$, $t_3$ and $t_6$. They occur at the time the leading bit of the trunk number code of a discrete storage area appears at the output of stage 4MO on FIG. 4. These pulses are used to control the operation of the logic circuitry. In like manner DNP and DNPN pulses occur when the first pulse of the data link code appears at the output of stage 4MO ($t_1$ and $t_4$). These pulses are shown on waveforms 1020 and 1025. An SNP and an SNPN pulse are also generated by clock 121 in a manner well known in the art when the beginning bit of each station number code appears at the output of stage 4MO ($t_2$ and $t_5$). These SNP and SNPN pulses are illustrated on waveforms 1030 and 1035. All clock pulses are shown in parentheses in FIGS. 2—8.

PBX to Memory Transfer

Figure 2:
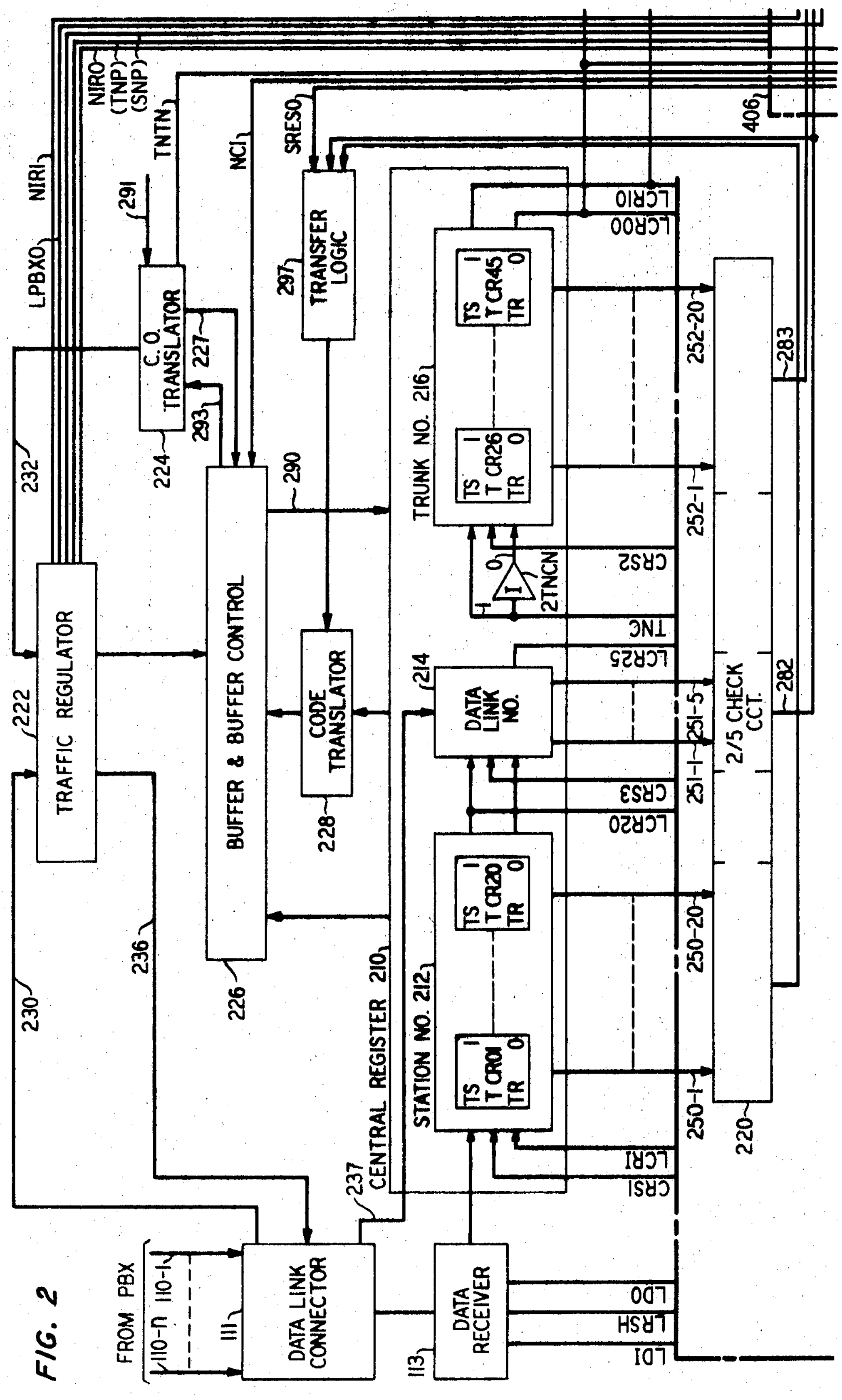
FIGS. 2—8 show a detailed logic diagram of an embodiment of our invention.

Trunk number and station identification codes are originated in a PBX and transmitted therefrom to the memory shown on FIG. 4 when a station associated with the PBX is connected to the central office via a trunk. If the call is an outgoing call to be billed, the code includes the trunk number through which the call is connected to the central office and the calling station identification number. Referring to FIG. 2, the PBX is connected to data link connector 111 via one of lines 110–1 through 110–N. Assuming line 110–1 is used, an alerting signal is first sent via line 110–1 to the data link connector and transmitted therefrom via lead 230 to traffic regulator 222. If the alerting signal occurs during the time alloted to memory station identification information indicated by clock pulse SNP, and the station identification equipment is not being used, the traffic regulator responds thereto by inhibiting any request for service from central office translator 224 and buffer control 226. The data connector link is then conditioned to receive the code from the associated PBX via line 110–1. The traffic regulator allows a single use of the station identification equipment and operates to hold up other requests from either another PBX or the central office.

The PBX data is transmitted in the form of frequency shift signals. A premessage synchronizing bit is first sent to the data link connector and transmitted therefrom to data receiver 113. This premessage bit provides a one signal on line LDI of FIG. 3 and a zero signal on line LDO of FIG. 3. All flip-flops and shift register stages of FIGS. 2 through 8 were previously reset so that shift register stages 3CRF and 3CRFA, FIG. 3, each provide a low output on the one lead and a high output on the zero lead. Thus output of NOR gate 3DRCR, FIG. 3, provides a low output in response to the high signal on line LDI. This low output is applied to NOR gate 3CRI and the output of gate 3CRI is transmitted via line LCRI to the input of central register 210. More particularly, it is applied to the first shift register stage of station number register 212.

Each shift register stage of the central register is substantially identical to the shift register stage of the memory recirculation loop except that the shifting pulse is derived from lead 1CRS1 for station number register 212, 1CRS3 for data link register 214, and 1CRS2 for trunk number register 216. The low signal on line LDO during the premessage bit enables gate 3RS on FIG. 3 since the one output of stage 3CRFA is also low. The high output of gate 3RS then sets flip-flop 3RC which in turn provides an alerting signal to gate 3RCS. A data receiving timing pulse is applied to line LRSH on FIG. 8 from the data receiver circuit each time another input bit is received by data receiver 113. The premessage bit opens gate 3RCS and an inverted signal from inverter 3RCN is applied to gates 3CRS1 and 3CRS2. The output of gate 3RCN causes gates 3CRS1 and 3CRS2 to apply shift pulses to station number register 212 and trunk number register 216, respectively, so that the premessage bit is gated into the first stage of station number register 212. The station code and trunk code registers are connected in cascade.

The succeeding outputs from data receiver 113 corresponding to the transmitted code are also applied to gate 3DRCR via line LDI so that these bits are successively placed in series in station number register 212 and trunk number register 216 under control of the shift pulses from gates 3CRS1 and 3CRS2. The output of station number register 212 is transmitted to gate 3SNTN via line LCR20. Gate 3SNTN is now enabled because the one output of the 3CRFA stage is low and the signals applied to line LCR20 pass through gates 3SNTN and 3TNC. The output of gate 3TNC is applied to the TS input of the first trunk number shift register stage, FIG. 2, and the inverse of this stage is applied to the TC input of this stage via inverter 2TNCN.

As explained with respect to the memory recirculation loop, the signals applied to conditioning inputs TS and TC cause the information to be shifted under control of the shifting pulses from gate 3CRS2 into the trunk number register 216. Because the zero output of the 3CRFA stage is high, gate 3DNTN is inhibited and the output of data link register 214 on line LCR25 is not transmitted to the trunk number register. In this way the 40 bits of the code and a premessage bit transmitted from the associated PBX via line 110-1 are converted from frequency shift signals by data receiver 113 to pulses and placed in serial fashion in trunk number register 216 and station number register 212. The trunk number portion of the code is shifted into the trunk number register after the premessage bit and the station number portion of the code is shifted into the station number register. A data link number code is generated in data link connector 111 and transmitted via lead 237 to data link number register 214 in parallel fashion.

At the time the PBX information is assembled in central register 210, the premessage bit is read out of the last stage of the trunk number register. The low zero output of this last stage (LCR00) is applied to the TC input of stage 3CRF so that stage 3CRF is conditioned to be set by the last clock shift pulse from gate 3CRS2. This is so because the TS input of stage 3CRF has a permanent high signal applied thereto. When stage 3CRF is set, the zero output therefrom becomes low and is effective to condition stage 3CRFA to be set by the next TNPN clock pulse. As noted previously the negative going TNPN clock pulse occurs at the beginning of the trunk code so that the high one output from 3CRFA resets flip-flop 3RC, which in turn inhibits gates 3RCS, 3RCN, 3CRS1 and 3CRS2. In this way the shift pulses are terminated at the end of the incoming code.

The change in state of stage 3CRFA inhibits gates 3DRCR and 3SNTN via lead 310, and alerts gate 3DNTN via lead CRFAO. The enabling of gate 3DNTN then permits the data link code to be applied to trunk register 216 from data link register 214 so that the word stored in central register 210 including trunk, data link and station codes may be successively shifted out in serial fashion.

Each digit stored in central register 210 consists of five bits arranged in a two-out-of-five code. The outputs of register 210 are applied to two-out-of-five check circuit 220 via leads 250–1 through 250–20, 251–1 through 251–5 and 252–1 through 252–20. If each digit of the trunk number code passes the two-out-of-five validity check, an alerting signal is applied therefrom via lead 283 to the TC input of stage 8TN, FIG. 8. A second alerting signal corresponding to a properly checked data link number is applied via lead 282 to the TC input of stage 8DN, FIG. 8. Since a permanent high signal is applied to the TS inputs of these stages, the stages are conditioned to be toggled into the set state by the next DNP pulse. Stages 8TN and 8DN were previously reset so that gate 8KAN is enabled by the DNP pulse occurring after the TNPN pulse which sets stage 3CRFA. Set stages 8TN and 8DN in turn provide a low conditioning signal to the TC input of stage 8LP via gates 8PLPA and 8PLP, FIG. 8.

Figure 6:
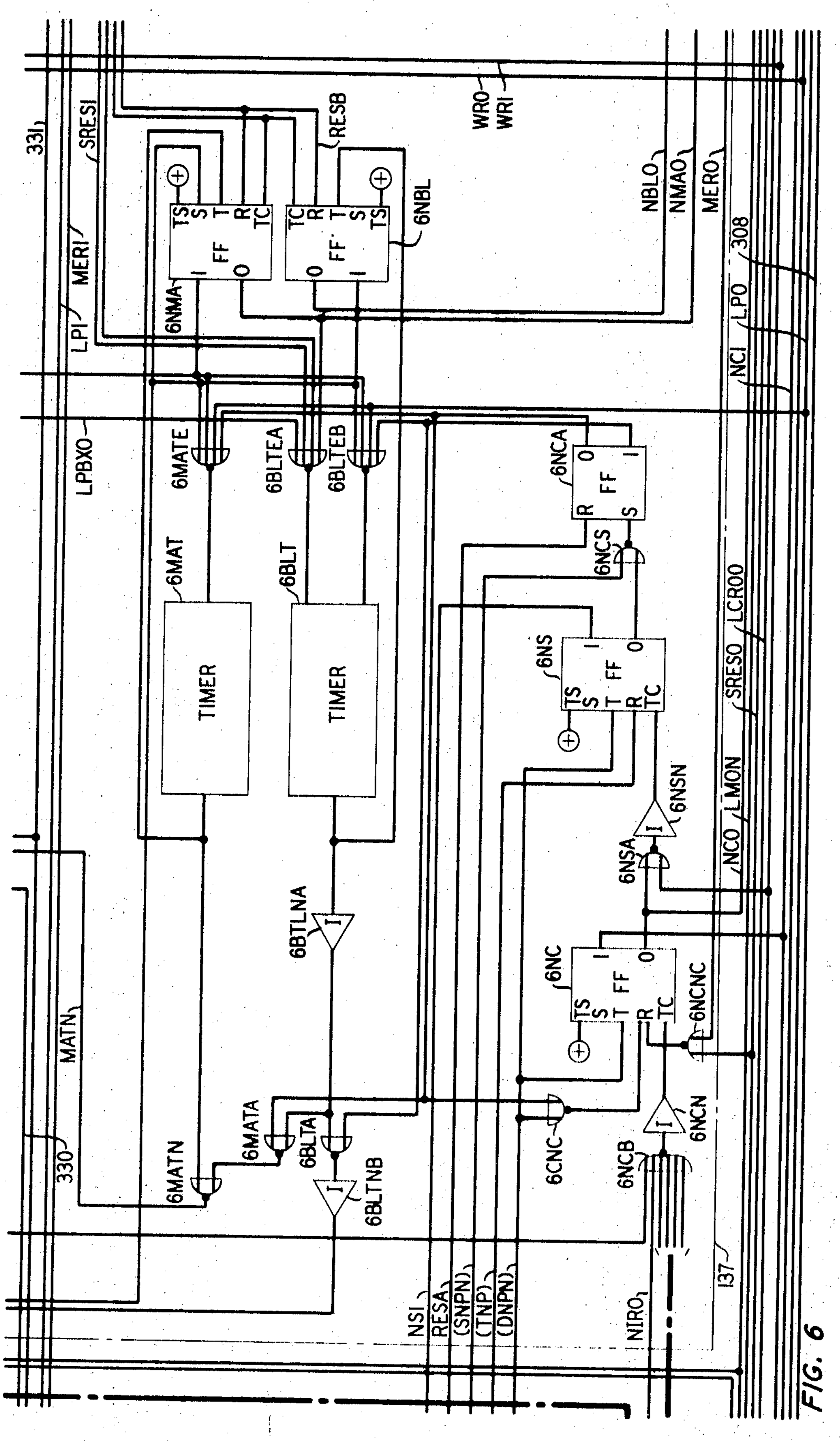

When stage 8LP is set by the next TNPN pulse the zero output therefrom is transmitted to gate 6MATE on FIG. 6 via lead LPO, cable 702, and lead 410. Gate 6MATE then provides a high signal to timer 6MAT which in turn provides an output for a maximum of 11.5 milliseconds. The 11.5 millisecond period covers one complete memory scan. Timer 6MAT in conjunction with stage 6NMA on FIG. 6 determines whether a trunk number match is obtained within one complete cycle of the memory loop. If there is no match within the maximum period of enabled timer 6MAT, a search for a blank discrete storage area is initiated as hereinafter described.

Figure 5:
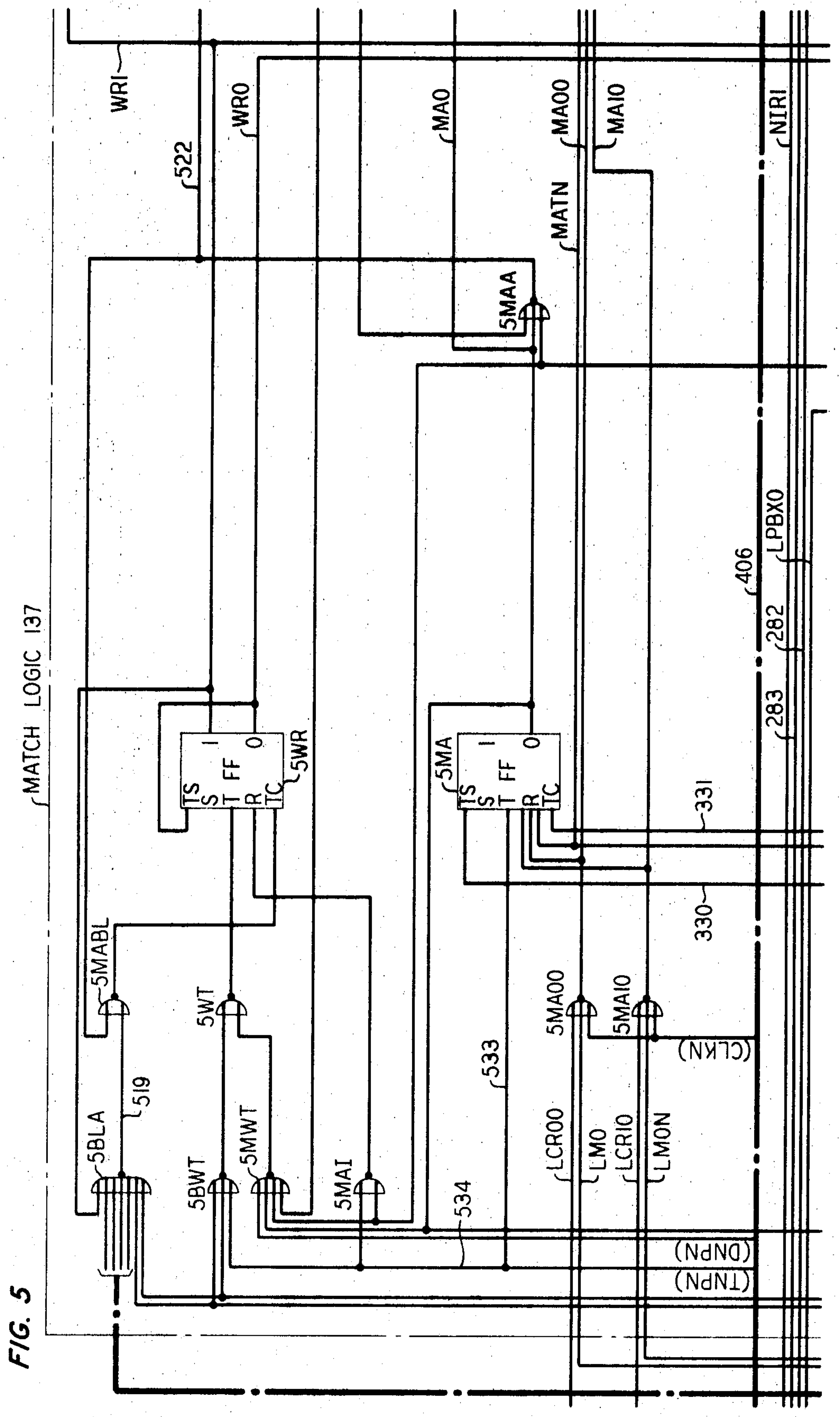

The zero output of stage 8LP is also applied to gate 3CRCR via lead LPO. Since shift register stage 5WR of FIG. 5 is reset at this time, gate 3CRCR is enabled and the output signals from the last stage of trunk register 216 pass through gate 3CRCR from line LCR10 to gate 3CRI and therefrom via line LCRI to the input stage of station number register 212. Gate 3CRCR operates to close the path from the output of trunk register 216 to station register 212 so that the code stored in central register 210 is continuously recirculated.

The recirculation of the central register is timed to be in synchronism with the recirculation of the memory loop of FIG. 4. This is done in response to the setting of stage 8LP which in sequence enables gates 3LPA, 3LPN and 3SCS of FIG. 8. With gate 3SCS enabled, 1 megahertz clock signals CLN from lead 303 are applied to gates 3CRS1, 3CRS2 and 3CRS3 on FIG. 3, and the outputs of these last mentioned gates are transmitted to each stage of central register 210 to shift the information at the clock rate applied to the memory recirculation loop. Gates 3SCS, 3CRS1 and 3CRS2 are each operative to provide a low output only if all inputs are high. The other gates of FIGS. 2—8 provide high outputs only if all inputs thereto are low.

The outputs of stage 3CRFA are applied to stage 5MA on FIG. 3 via leads 330 and 331. Since stage 3CRFA is now set, stage 5MA is conditioned by 3CRFA to be toggled to the set state. The TNPN clock pulse is applied to the toggle input of stage 5MA via lead 533 so that stage 5MA is set when the first bit of each discrete storage area of the memory loop appears at the output of stage 4MO. Stage 5MA is used to detect a match between the 20 bit trunk code stored in central register 210 and one of the 20 bit trunk codes stored in the memory loop.

A match comparison is performed in gates 5MA00 and 5MA10. The one and zero outputs of stage 4MO of the memory loop are applied via leads LMON and LMO to gates 5MA00 and 5MA10, respectively, on FIG. 5. The one and zero outputs of the last trunk register stage are also applied to these gates via leads LCR00 and LCR10. Clock pulses (CLKN) from clock 404 are also applied to each of these gates to appropriately time each bit comparison. Gates 5MA00 and 5MA10 function as an exclusive OR circuit so that the matching of the 20-bit trunk code from central register 210 with a trunk code from the memory loop does not change the state of stage 5MA. If any bit of the trunk numbers does not match, the output of either gate 5MA00 or 5MA10 becomes high so that stage 5MA is reset. The occurrence of the next TNPN pulse sets stage 5MA for match testing of the central register word with the succeeding discrete storage area.

Assume a match is obtained within the memory cycle determined by timer 6MAT. This match leaves stage 5MA set at the end of the trunk code being tested so that a low zero input from stage 5MA is applied to gate 5MAA on FIG. 5. Gate 5MAA also receives a permissive input from previously reset stage 6NMA. The third input to gate 5MAA is from the 8TN stage which has been set in response to a successful two-out-of-five check in check circuit 220. At this time the output of gate 5MAA becomes high and is transmitted via lead 522 to gate 5MABL on FIG. 5. Gate 5MABL then provides a low conditioning input to the TC input of stage 5WR. Since stage 5WR has been previously reset, the TS input receives a high signal from the zero output of the stage. Under these conditions, stage 5WR is conditioned to be set upon receipt of a negative-going pulse from gate 5WT on FIG. 5.

Gate 5MWT on FIG. 5 now receives enabling signals from stages 5MA, 6NMA and 8DN so that the DNPN clock pulse occuring at the end of the trunk number match passes through gate 5MWT, to provide a positive signal at the input of gate 5WT. This in turn applies a negative going toggle input to stage 5WR so that stage 5WR switches to the set state. The setting of stage 5WR starts the exchange of information between the central register and the memory. It sets flip-flop 7WER of FIG. 7 which in turn switches the TC input of stage 6NMA to the one state so that the output timer 6MAT has no effect on stage 6NMA. The one output of stage 7WER is now in the high state and provides a reset input to stage 8LP via lead 710. Resetting stage 8LP in sequence disables gate 6MATE on FIG. 6, stops timer 6MAT, disables gate 6MATN on FIG. 6 so that stage 5MA is reset and gates 5MAA and 5MABL are disabled. This in turn restores the TC input of stage 5WR to the one state and stage 5WR remains set. With stage 5WR set, gates 3LPA, 3LPN and 3SCS remain enabled and shift pulses continue to be applied to the central register.

The high one output of set stage 5WR is applied via lead WRI to disable gate 3CRCR. This severs the central register loop. The low zero output of stage 5WR is applied to gates 3CRM and 3MCR of FIG. 3 via lead WRO so that these gates are enabled. The output of trunk register 216 then passes through gate 3CRM and 3MII to the input stage 4MI of the memory. In this way the data and station codes stored in central register 210 may be transferred to an appropriate portion of the matched discrete storage area of the memory loop. Gate 3MCR completes the path for bit pulses from the output of stage 4MO of the memory loop to the input of the central register via gates 3CRI and line LCRI. Gate 3MME is also enabled by the zero output of stage 5WR and its output inhibits gate 3MM of FIG. 3 so that the memory recirculation loop is blocked.

The exchange of information between the memory loop and the central register continues until the occurrence of the next TNPN clock pulse. This clock pulse is applied to gate 5MAI via lead 534. The other input to gate 5MAI from stage 6NMA is permissive at this time and the high output of gate 5MAI is transmitted to the reset input of stage 5WR. Stage 5WR is then reset and gates 3MCR, 3CRM and 3MME of steering logic 119 on FIG. 3 are disabled. This, in turn, severs the path from the memory output to the central register input and the path from the central register output to the memory input whereby the exchange of information is ended before the first bit of the succeeding discrete storage area appears at the output of stage 4MO. The memory loop resumes its recirculation through gates 3MM and 3MII since gate 3MM is reenabled.

If the search of a trunk code match is not successful within the period provided by timer 6MAT, a blank search is started so that the entire code stored in central register 210 can be transferred to the memory. The blank search is initiated by a low output from timer 6MAT, if, after its 11.5 millisecond timing period is over, there is no match. This low output is applied to stage 6NMA to toggle it to the set state. Gate 5MAI is inhibited by the high one output from stage 6NMA. The zero output of stage 6NMA also enables gate 6BLTEA since flip-flop 7WER is reset. The output of gate 7WERP is low; stage 7SRES is reset; and the presence of a PBX request makes the PBXO signal input to 6BLTEA from regulator 222 low. This in turn starts 11.5 millisecond timer 6BLT. Timer 6BLT then produces a high output that successively enables inverter 6BLTNA, gate 6BLTA and inverter 6BLTNB. Inverter 6BLTNB, in turn, provides an enabling input to gate 5BLA on FIG. 5. A second enabling input is applied to gate 5BLA from the low one output of reset stage 6NBL. The other low inputs to stage 5BLA come from the one outputs of stages 4MOL1 through 4MOL4 of the memory loop on FIG. 4. When all of these stages are reset, the low one outputs therefrom indicating a blank storage area cause gate 5BLA to provide a high output on lead 519. This high output is applied to gate 5MABL on FIG. 5 which in turn provides a low conditioning input to terminal TC of stage 5WR. In this way the 5WR stage is conditioned to be set when a toggle input is applied thereto via gate 5WT. The first trunk code digit is in the form of a two-out-of-five code and cannot contain all zeros. Thus, the occurrence of zeros in stages 4MOL1 through 4MOL4 is interpreted as a blank and this state of the storage area initiates the transfer of the complete central register code into the selected blank storage area of the memory.

The low output of inverter 6BLTNB is also applied to gate 5BWT together with the low one output of reset stage 6NBL. This allows the next TNPN pulse from lead 534 to put gate 5BWT in the one state. The high output of gate 5BWT is then applied to gate 5WT so that stage 5WR is toggled to the set state by the negative going transition of gate 5WT.

Flip-flop 7WER is now set by the high one output of stage 5WR. Flip-flop 7WER operates to restore the TC input of stage 6NBL to the high state and to clear stage 8LP on FIG. 8. The output of gate 6BLTEA remains high and timer 6BLT, gates 6BLTNA, 6BLT, 6BLTNB and 5BLA remain enabled.

As hereinbefore described, the outputs of set stage 5WR are applied to steering gate logic 119 so that gate 3CRCR of FIG. 3 is disabled and gate 3MME is enabled. Enabled gate 3MME in turn disables gate 3MM. At this time both the central register and the memory loops are severed but gates 3MCR and 3CRM are enabled to permit the exchange of information between central register and the memory loop for one word. This allows the complete transfer of the trunk code, data code, and station code from the central register to the memory, and the blank contents of the corresponding storage area in the memory to the central register.

When the exchange of data has been completed, a TNPN clock pulse is applied to gate 5BWT on FIG. 5. Gate 6BLTNB remains enabled because stage 5WR is in the set state although flip-flop 7WER is reset. Gate 5BWT also receives permissive signals from the reset 6NBL stage and enabled inverter 6BLTNB so that a positive going signal is supplied from gate 5BWT to gate 5WT which in turn toggles stage 5WR to the reset state. This is so because the TS input of stage WR has been conditioned by its zero output and the TC input is conditioned by a high output from gate 5BLA via gate 5MABL. The pulse from gate 5WT resets stage 5WR.

The resetting of stage 5WR disables gate 3CRM which severs the output of the central register from the input of the memory, and disables gate 3MCR which severs the output of the memory from the input of the central register. Gate 3MME is also disabled. This in turn enables gate 3MM to reclose the memory loop. The clock shift pulses from gates 3CRS1, 3CRS2 and 3CRS3 are stopped because gates 3LPA and 3LPN and 3SCS are successively disabled by the low one output of stage 5WR. Thus the central register is staticized. If the trunk match was successful, trunk register 216 contains the trunk number from the memory while station number register 212 and data link register 214 are blank. In the event that a blank search was required the entire central register is blank.

Figure 7:
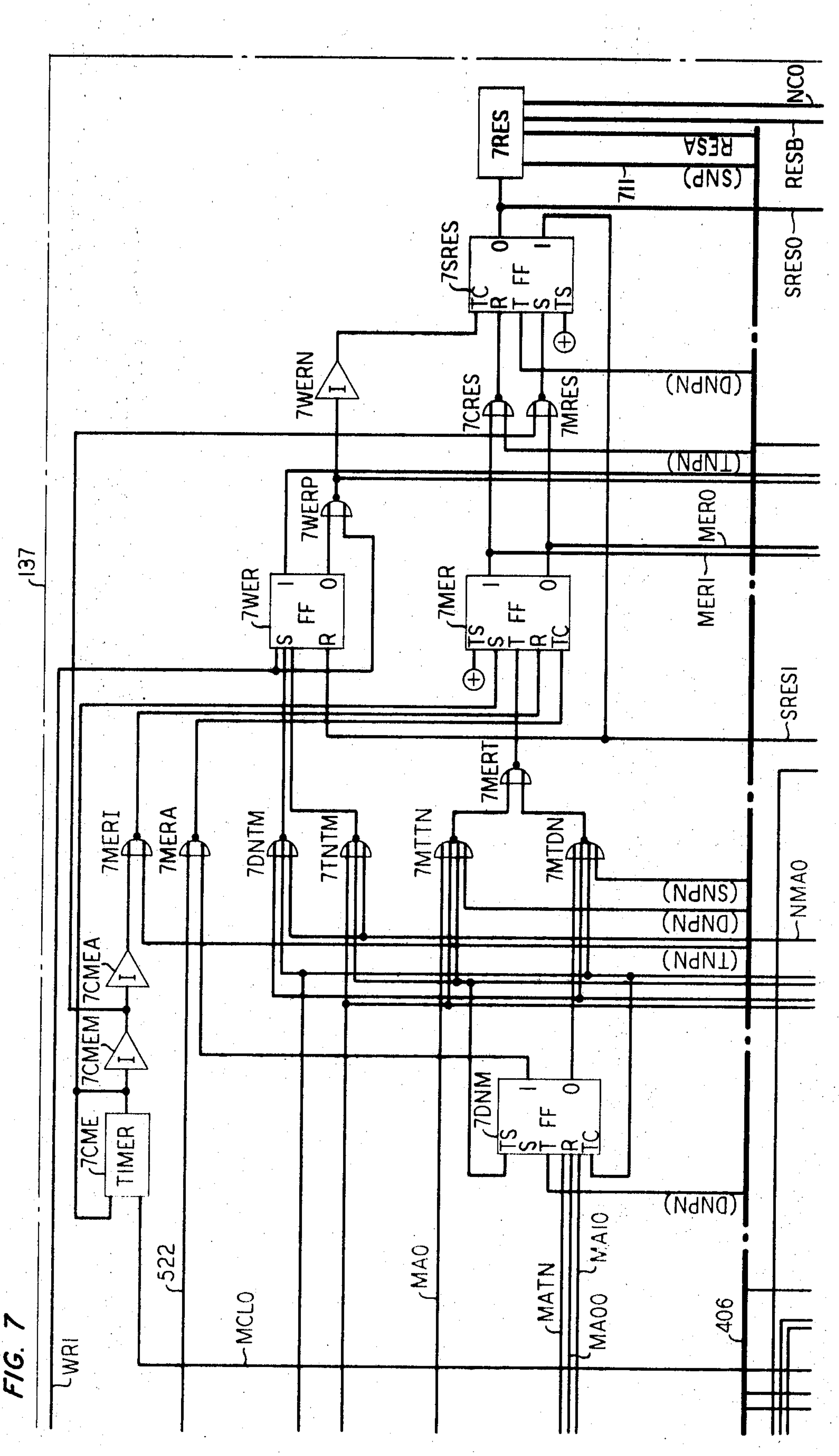
Figure 8:
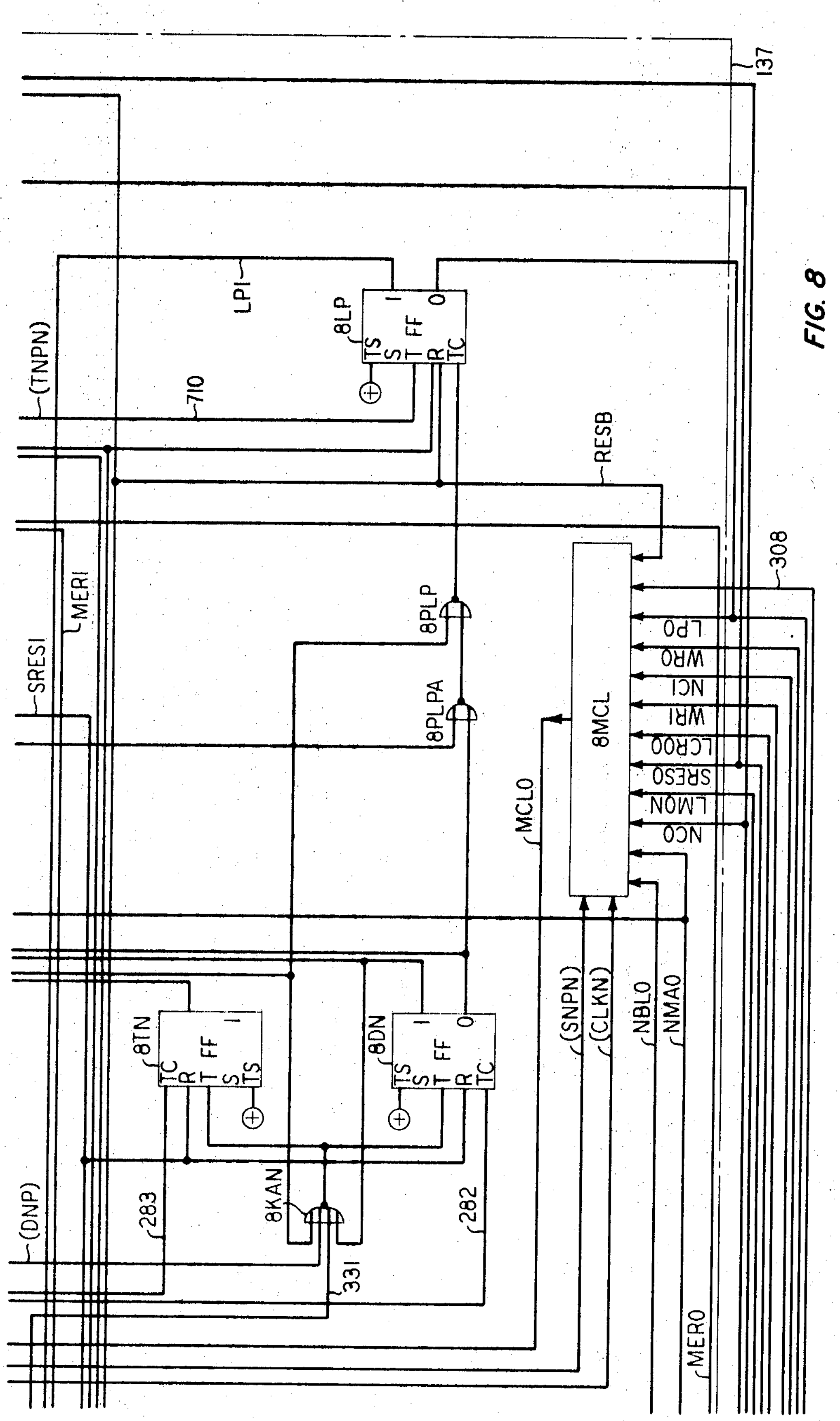

The low one output of reset stage 5WR and the low zero output of set flip-flop 7WER enable gate 7WERP and inverter 7WERN on FIG. 7. The output of inverter 7WERN provides a low signal to the TC input of stage 7SRES on FIG. 7. This stage is now conditioned to be toggled to the one state, and the succeeding DNPN clock pulse on the toggle input of stage 7SRES switches it to the one state.

Stage 7SRES controls the resetting of all the stages and flip-flops in the control logic. The high one output of stage 7SRES is supplied to the reset input of flip-flop 7WER to reset that flip-flop, which in turn resets gates 7WERP and 7WERN. The high one output of stage 7SRES is also applied via lead SRES1 to reset stages TN and DN. The low zero output of stage 7SRES is applied to reset logic 7RES which is enabled by the succeeding SNP clock pulse applied via lead 711, and the RESB and RESA outputs therefrom reset the appropriate stages and flip-flops of the logic of FIGS. 2 through 8 to return the system to its normal state. Reset logic 7RES remains on until a subsequent transfer request is made.

Central Office Number Identification Request

When the automatic accounting equipment in the central office requires a station identification number from the memory of FIG. 4, a request signal is applied from translator 224 to traffic regulator 222. In the event that there is no PBX transfer to the memory at this time, traffic regulator 222 applies a blocking signal to data link connector 111 via lead 236. This prevents a PBX transfer from being initiated.

The trunk code is then transmitted from the central office accounting equipment to translator 224 wherein it is translated from a one-out-of-ten code used in the central office to a two-out-of-five code required in central register 210. The two-out-of-five coded trunk number is then applied to buffer 226 via cable 227 and transmitted therefrom in parallel form to trunk register 216 via cable 290. Signals from translator 224 (lead NIRO) and regulator 222 (lead TSTN) are then applied to gate 3CRFE of FIG. 3 so that the next SNPN clock pulse may pass therethrough to set stage 3CRF. Stage 3CRF in turn applies a low zero signal to stage 3CRFA which conditions stage 3CRFA to be set by the next TNPN clock pulse. The setting of 3CRF and 3CRFA initiates the closing of the central register loop and the shift of the central register code.

The two-out-of-five check circuits 220 operate to check the trunk code inserted into register 216. The check circuit output is supplied to condition stage 8TN to be set if the trunk code is valid. A signal is also applied to lead 282 to condition stage 8DN to be set. Stages 8TN and 8DN are then toggled to the one state by the next DNP pulse via gate 8KAN as previously described. The setting of stage 8TN conditions stage 8LP to be toggled to the set state at the next TNPN pulse. When stage 8LP is set, shifting pulses at the clock rate are obtained from gates 3CRS1, 3CRS2 and 3CRS3, and gate 3CRCR is enabled so that the central register loop is completed. The matching of trunk codes between the central register and the memory loop via gates 5MA00 and 5MA10 and stage 5MA is then started and a successful match hereinbefore described prepares stage 5WR to be toggled to the one state. The next DNPN pulse then toggles stage 5WR to the one state via gates 5MWT and 5WT as previously described.

When stage 5WR is placed in the one state as a result of a successful match, timer 6MAT is restored via stages 7WER and 8LP to the low state and the configuration of steering gate 119 on FIG. 3 is changed so that the output of the memory is applied to the central register and the central register output is supplied to the memory for 25 bits between the DNP and TNP clock pulses. In this way, the transfer of the data code and the station number code from the memory to the central register is started. When the exchange of data in one storage area has been completed, the next TNPN clock pulse toggles stage 5WR to the zero state via gate 5MAI. This in turn causes the shift pulses from gates 3CRS1, 3CRS2 and 3CRS3 to stop and the central register is staticized. The central register now contains the station and data codes received from the addressed storage area in memory and these codes are checked by two-out-of-five check circuit 220. Just after the data exchange is completed, the memory loop is restored and the output of the memory is blocked from the central register in the manner hereinbefore described.

The station and data codes received by the central resister from the memory are checked for validity by check circuit 220. Output leads 281 and 282 of the check circuit are applied to transfer logic 297 which controls the transfer of the station and data link codes out of central register 210. Gate 7WERN of FIG. 7 is enabled since flip-flop 7WER is set. Gate 7WERN provides a low signal to the TC input of stage 7SRES which is now conditioned for toggling. Clock pulse DNPN toggles stage 7SRES to the set state after a short period of time during which the two-out-of-five check circuit is allowed to stabilize. The one output of stage 7SRES also resets stages 8DN and 8TN on FIG. 8. The zero output of stage 7SRES is also applied to transfer logic 297 via lead SRESO, which logic provides a permissive signal to code translator 228 if the station and data codes are found valid in check circuit 220.

Code translator 228 receives the station number code and the data link code from the central register and applies these codes to buffer control 226, which in turn transmits the codes to central office translator 224. The two-out-of-five station and data codes are translated into one-out-of-ten codes in translator 224 and are transmitted therefrom to the central office automatic accounting equipment. Reset logic 7RES in response to the next SNP clock pulse then provides signals to the stages and flip-flops of FIGS. 2 through 8 to restore them to the normal state. During the restore operation, the trunk station and data codes in central register 210 are erased and the two-out-of-five check circuit is returned to normal.

Central Office Transfer with Trunk Number Change

If a change in trunk number is required, the new trunk number is first assigned in the central office. Some delay, however, is involved before the change to the new trunk number can be made in the associated PBX. Prior to the trunk number change, the PBX continues to transmit identification data using the old trunk number stored in the memory of FIG. 4. When the new trunk number is assigned in the central office, a special code is inserted into central register 210 from circuitry not shown in the format of 1007 on FIG. 10. The new trunk code is placed in the trunk code section of one of the discrete storage areas. The corresponding old trunk code is placed in the station code section of the storage area and five logic ones are placed in the data number code of the storage area. The five logic ones are used to indicate that a trunk number change code is contained in this storage area. A memory central register data change is then initiated during which the special code in central register 210 is transferred to a blank area in the recirculating memory.

When the new trunk code is transmitted from the central office via translator 224 and buffer 226 to trunk code register 216 of the central register, a search for a match is initiated in the manner described with respect to the normal central office request. The trunk number match is recognized when clock pulse DNPN momentarily enables gate 5MAI of FIG. 5, which in turn toggles stage 5WR to the one state via gate 5WT. At this time gate 6NCB on FIG. 6 is momentarily enabled by four low signals from the zero outputs of stages 4MOL1 through 4MOL4 on FIG. 4. These low signals correspond to the logic ones of the special data code. The low zero output of stage 5MA of FIG. 5 is also applied to station 6NCB as well as an enabling signal on lead NIRO from traffic regulator 222. The output of enabled gate 6NCB inverted by inverter 6NCN then permits stage 6NC of FIG. 6 to be toggled to the set state by the next DNPN clock pulse. This occurs at the same time stage 5WR is set.

The high one output of set stage 5WR is now applied to disable gate 3CRCR of FIG. 3 and the central register loop is severed. The one output of set stage 6NC is applied to inhibit gate 3MME so that the memory loop remains closed through gates 3MM and 3MII. The high one output from 6NC is applied via lead 3NCI to inhibit the operation of buffer 226. Gate 3MCR is enabled by the low zero output of stage 5WR whereby the data and station codes from the memory are transferred into the central register via gate 3CRI and lead LCRI while being fed back into the memory loop through gates 3MM and 3MII. This occurs during the 25 bit interval between the DNP clock pulse and the next TNP clock pulse. Flip-flop 7WER is also set by stage 5WR at this time.

As soon as the 25 bits in the data and station codes of the addressed storage area have been registered in the central register, clock pulse TNPN momentarily enables gate 5MAI of FIG. 5 since stage 6NMA is reset. The high output from gate 5MAI, in turn, clears stage 5WR to the reset state. With stage 5WR in the reset state, gates 3MCR and 3CRI are disabled and the transfer from the memory to the central register is stopped. Gates 3LPA, 3LPN and 3SCS are also disabled by the resetting of stage 5WR. This operates to block shift pulses from gates 3CRSI, 3CRS2 and 3CRS3 from the shift register stages of the central register. The central register now contains the new trunk code in trunk register 216, five logic ones in data register 214, and the old trunk code in register 212. All of this data also remains in the memory for use in subsequent operations. Since stage WR is reset and stage 6NC is set, stage 6NS is to be conditioned through gates 6NSA and inverter 6NSN to be set by the next DNPN clock pulse. Stage 7SRES is also toggled to the set state by the same DNPN clock pulse since it was previously conditioned by enabled gate 7WERN. This in turn resets stages 8TN and 8DN on FIG. 8. Logic 7RES is inhibited by the output of stage 6NC via lead NCO.

The setting of stage 6NS prepares gate 6NCS on FIG. 6 to allow the next SNPN clock pulse to set flip-flop 6NCA via gate NCS. The high one output of flip-flop 6NCA inhibits gates 6MATE and 6BLTEA, and the low zero output of flip-flop 6NCA prepares timer 6BLT for turn-on by stage 8LP through lead LPO and gate 6BLTEB. The one output of stage 6NS also successively enables gates 3LPA, 3LPN and 3SCS on FIG. 3 so that the clock pulses from lead 303 pass through gate 3SCS and provide central register shift pulses via gates 3CRS1, 3CRS2 and 3CRS3. The outputs of these gates shift the contents of the central register for 25 bits; but since gates 3CRM and 3CRCR are both inhibited, the 25 data bits emerging from the last stage of trunk register 216 are dissipated. After 25 shift pulses, clock pulse TNP clears stage 6NS on FIG. 6 which in turn disables gates 3LP, 3LPN and 3SCS so that the central register is stationary. The old trunk code is now in trunk register 216 while station register 212 and data register 214 contain only zero bits. A TNPN clock pulse occurring at the same time as the just mentioned TNP pulse now momentarily enables gate 7CRES on FIG. 7, which in turn resets stage 7SRES.

The two-out-of-five check circuit 220 responds to the old trunk code output of trunk register 216 and if the contents of the trunk register are valid an enabling signal is applied to lead 283. This enabling signal is sent to stage 8TN on FIG. 8 to condition that stage to be set. The next DNPN pulse momentarily enables gate 6CNC on FIG. 6 which clears stage 6NC, and the DNP clock pulse occurring at the same time enables gate 8KAN on FIG. 8 which in turn toggles stages 8TN and 8DN to the set state. As previously described, the setting of stage 8TN prepares stage 8LP on FIG. 8 to be toggled to the set state by the next TNPN clock pulse. This arrangement initiates a match search based on the old trunk number contained in trunk register 216. The search now proceeds as previously described except that timer 6BLT is used instead of timer 6MAT and gate 6MATN is enabled by gate 6MATA. Set flip-flop 6NCA inhibits gate 6MATE and timer 6MAT. When a successful match is achieved, stage 5WR is again set via gates 5MWT and 5WT so that exchange of data between the central register and the memory is accomplished in the manner described with respect to the normal central register transfer request. At the end of the transfer, the central register shifting is stopped and the contents thereof are checked for validity in two-out-of-five check circuit 220 and transferred to the central office translator 224 as hereinbefore described. Also, the logic of FIGS. 2 through 8 is returned to normal. The return to normal includes resetting of flip-flop 6NCA on FIG. 6.

Memory Erase

In the event that two-out-of-five check circuit 220 indicates a trunk code or a data code is invalid, the aforementioned transfers of information between the central register and the recirculating memory are inhibited and information associated with the invalid code is erased from the memory. If the trunk code is invalid all station codes associated with the valid data code are erased from the memory. On the other hand, an invalid data code causes all data codes and station codes associated with the valid trunk code to be erased from memory.

The erasure of the data and station codes based on a valid trunk code but invalid data code proceeds as follows. The data code check output of circuit 220 is transmitted via lead 282 to stage 8DN of FIG. 8. An invalid data code provides a high signal to the TC input of stage 8DN so that this stage is not toggled to the one state by the appropriate DNP pulse via gate 8KAN. The one output of reset stage 8DN provides a low permissive signal to gate 7MTTN on FIG. 7. The low zero output of set stage 8TN provides another permissive signal to this gate, and the zero output of stage 5MA also provides a permissive signal via lead MAO to gate 7MTTN when a trunk match is detected by stage 5MA in the hereinbefore described manner. The successful trunk match allows the next DNPN clock pulse to pass through cascaded gates 7MTTN and 7MERT to the toggle input of stage 7MER which stage controls memory erasing. Stage 7MER is conditioned to toggle to the set stage by the output of gate 5MAA via gate 7MERA upon the occurrence of a trunk match.

The high one output from stage 7MER is applied to gate 3MII on FIG. 3 via lead MER1 so that the memory loop is severed during the time interval beginning with a DNPN pulse and ending with a TNPN pulse which operates through gate 7MERI on FIG. 7 to reset stage 7MER. The invalid data code and the station code associated with the addressed memory storage area is erased.

The erasure of station codes based on an invalid trunk code but valid data code proceeds as follows. When the trunk code check output of circuit 220 is high indicating an invalid trunk code, this high signal is transmitted via lead 283 to stage 8TN of FIG. 8 to prevent stage 8TN from being toggled to the set state by the appropriate DNP pulse sent via gate 8KAN. Since the data code is valid, stage 8DN is set by this DNP pulse. In this way permissive signals are applied to gate 7MTDN on FIG. 7 from stages 8TN and 8DN.

The outputs of stage 8DN are also applied to stage 7DNM to condition that stage to be toggled to the one set state by the DNPN pulses applied to the toggle input thereof. The outputs of gates 5MA00 and 5MA10 of FIG. 5 are applied to reset inputs of stage 7DNM so that a data code mismatch, detected as a result of the comparison of the central register and the recirculating memory, resets stage 7DNM and the zero output therefrom inhibits gate 7MTDN. The occurrence of a successful match leaves stage 7DNM set so that the zero output therefrom provides an enable signal to gate 7MTDN. The next SNPN pulse passes successively through gate 7MTDN and gate 7MERT to toggle stage 7MER to the set state. Stage 7MER had been conditioned to be set by the high one output from stage 7DNM applied to stage 7MER via gate 7MERA. In this way the occurrence of a data code match, after an invalid trunk number has been detected, causes stage 7MER to be set. This, in turn, erases the associated station number code in the recirculating memory. At the end of the memory cycle during which erasure occurs, stage 6NMA of FIG. 6 is in the set state so that flip-flop 7WER is set via lead NMAO and gate 7DNTM in the case of an invalid data number or via lead NMAO and gate 7TNTM in the case of an invalid trunk number. The setting of flip-flop 7WER initiates the restoring sequence which causes the logic of FIGS. 2 through 8 to return to the normal state.

Errors in the operation of the control logic of FIGS. 2 through 8 are detected in memory check logic 8MCL on FIG. 7. These errors may be caused by an incorrect sequence of control signals or some other predictable operation error. The output of logic 8MCL is applied via lead MCLO to timer 7CME which responds thereto by providing a high set signal to stage 7MER. During the active period of timer 7CME, the output of inverter 7CMEA on FIG. 7 locks gate 7MERI so that stage 7MER remains in the set state for one entire memory cycle. The output of stage 7MER then inhibits gate 3MII on FIG. 3 so that all storage areas of the recirculating area are erased. After timer 7CME is reset, the next TNPN clock pulse applied to gate 7MERI resets stage 7MER. Timer 7CME is also enabled if both the trunk and data link codes are invalid on a PBX request as determined by the status of stages 8TN and 8DN.

The restoring to normal of the control logic of FIGS. 2—8 takes place while stage 7MER is set and the memory erase operation is in progress. The low zero output of set stage 7MER together with the low output of inverter 7CMEM on FIG. 7 enables gate 7MRES which, in turn, sets stage 7SRES. When stage 7MER is reset at the end of the memory erase cycle determined by timer 7CME, the low zero 7MER output allows the next TNPN clock pulse to reset stage 7SRES. When stage 7SRES is in the set stage, reset logic 7RES operates to return the logic of FIGS. 2—8 to normal.

Various other aspects of the embodiments described herein are disclosed and claimed in the copending application of R. A. Thompson Ser. No. 818,564, and filed Apr. 23, 1969.

We claim:

1. In a switching system, a message store comprising storage means, a recirculating memory for storing a plurality of messages in serially arranged discrete storage areas, each discrete storage area including means for storing first and second codes, said first code preceding said second code, means for inserting a message including a first code in said storage means, said storage means including means for selectively recirculating codes stored therein, means for selecting one of said discrete storage areas comprising means for matching the first code in said storage means with a first code in one of said discrete storage areas including means for serially comparing the first code of said recirculating storage means with the first codes of said recirculating memory, and means responsive to the detection of a match in said matching means for exchanging the second code in said storage means with the second code in the selected discrete storage area comprising means for connecting the output of said storage means with the input of said memory and the output of said memory with the input of said storage means.

2. In the switching system, a message store according to claim 1 wherein said matching means further comprises means for detecting the absence of a match between the first code of said storage means and the first codes of said serially arranged discrete storage areas during one memory scan and means responsive to said detection for selecting a blank storage area during the succeeding memory scan, and said switching means comprises means for inserting the first and second codes of said storing means into said blank storage area during said succeeding memory scan.

3. In a switching system, a message store according to claim 2 further comprising means for checking the validity of said first and second codes and means responsive to the operation of said checking means for selectively erasing portions of said memory whereby invalid codes are removed from the memory during one memory scan.

4. A switching system comprising a central office, at least one private branch exchange having a plurality of stations, and a station identification store associated with said central office; said central office being connected with each exchange via a plurality of trunks; each exchange being connected with said station identification store via a data link; said central office being connected with said station identification store via a transmission path; means associated with each exchange responsive to outdialing from one of said exchange stations through a selected trunk for transmitting a message including a station identification code and a selected trunk code over said data link; said station identification store comprising a circulating memory having a plurality of sequentially arranged discrete storage areas each for serially storing a message associated with said outdialing including an exchange code and a station code preceded by a trunk code; and control means responsive to receipt of said transmitted message including said selected trunk code for inserting the exchange and station codes into a discrete storage area having said selected trunk code and responsive to said selected trunk code received from said central office for retrieving said stored exchange and station codes from said memory.

5. A switching system according to claim 4 wherein said control means comprises means for storing said received message, means for inserting said exchange code between said trunk and station codes, means responsive to said selected trunk code in said storage means for addressing one of said discrete storage areas, and means for exchanging exchange and station codes between said received message storing means and said addressed discrete storage area whereby said addressed exchange and station codes are addressed and exchanged during one memory scan.

6. A switching system according to claim 5 wherein said addressing means comprises means for matching said selected trunk code with one of said discrete storage area trunk codes, and said exchanging means comprises means responsive to the detection of a trunk code match by said matching means for connecting the output of said memory to the input of said message storing means and the output of said message storing means to the input of said memory.

7. A switching system according to claim 6 further comprising means responsive to the detection of the absence of a match between said selected trunk code and the trunk codes of said memory during one memory scan for detecting a blank storage area during the succeeding memory scan and means for transferring the message from said message storing means to said blank storage area during said succeeding memory scan.

8. A switching system according to claim 7 wherein said blank storage area detecting means comprises means responsive to a predetermined trunk code for signaling the occurrence of a blank storage area.

9. A switching system according to claim 7 wherein said received message storing means comprises shift register means for serially storing said received trunk code, said exchange code, and said station code, said addressing means comprises means for checking the validity of said serially stored codes of said received message, means responsive to the operation of said checking means for generating a group of repetitive pulses to shift the stored codes of said shift register means, means for sequentially comparing said received trunk code with said discrete storage area trunk codes, and means responsive to a match between said shift register stored trunk code and one of said discrete storage area trunk codes for enabling said exchanging means immediately after said match.

10. A switching system according to claim 9 further comprising means responsive to the detection of an invalid trunk code by said checking means for serially selecting all discrete storage areas containing the data link code associated with said invalid trunk code and for erasing the station codes in said selected discrete storage areas during one memory scan including means for matching the associated exchange code with the exchange codes of said discrete storage areas.

11. A switching system according to claim 9 further comprising means responsive to the detection of an invalid exchange code by said checking means for selecting all discrete storage areas containing the trunk code associated with said invalid data link code and for erasing all station and exchange codes in said selected storage area during one memory scan.

12. A switching system according to claim 9 further comprising means responsive to the detection of an invalid trunk code and an invalid exchange code in said received message for erasing all discrete storage areas in one memory scan.

13. A telephone switching system comprising a central office and at least one private branch exchange having a plurality of stations, said central office being interconnected with each exchange via a plurality of trunks and a data link, means associated with each exchange responsive to outward dialing from one of said exchange stations over a selected one of said trunks for transmitting a message representing the identity of said station and said trunk to the central office over said data link, said central office comprising automatic accounting means for billing calls from said exchanges, a memory comprising a plurality of sequential storage areas each for storing a station code, a data link code and a trunk code associated with said outward dialing, control means comprising means responsive to receipt of said transmitted message for inserting codes corresponding to the station and data link identity in the said message in the discrete storage area of said memory which includes said trunk code and responsive to a trunk code from said accounting means for retrieving the station identity associated with said trunk code from said memory, said inserting and retrieving means including means responsive to said trunk code for addressing a particular discrete storage area, said discrete storage area being arranged to serially store the station identity and data link codes after said trunk code whereby only one memory scan is required for the addressing, and insertion or the retrieval of said station identity and data link codes.

14. A telephone switching system according to claim 13 wherein said memory comprises means for recirculating said sequential storage areas, said control means comprises means for storing said transmitted message and means for serially recirculating said transmitted message, said addressing means comprises means for serially comparing the bits of the trunk code from said recirculating storing means and the bits of the trunk codes from said recirculating discrete storage areas, and means responsive to the detection of identical trunk codes by said comparing means for serially exchanging the station identity and data link codes between said storing means and the discrete storage area having said identical trunk code immediately after said detection.

15. A telephone switching system according to claim 14 further comprising means responsive to the absence of the detection of identical trunk code by said comparing means during one memory scan for detecting a predetermined code in one of said discrete storage areas during the succeeding memory scan, and means for serially exchanging the message from said storing means and the contents of the detected storage area during the succeeding memory scan.

16. In combination with a switching system including a central office, at least one private branch exchange having stations connected thereto, and trunks between said office and said exchange, an arrangement for identifying stations and trunks employed on connections involving said exchange and said central office, said arrangement comprising storage means, means for separately storing in said storage means a trunk code and a station code representing a station and a trunk employed in one such connection at said exchange, means for inserting in said storage means between said trunk code and said station code an exchange code representing said exchange, a serially arranged circulating memory having stored therein trunk codes, and means for transferring said exchange and station codes between said storage means and said memory as identified by said trunk codes, said trunk, exchange, and station codes being stored in said circulating memory in that order.